United States Patent
Akiyama (10) Patent No.: US 12,523,623 B2
(45) Date of Patent: Jan. 13, 2026

(54) X-RAY FLUORESCENCE ANALYZER AND X-RAY APERTURE MEMBER

(71) Applicant: SHIMADZU CORPORATION, Kyoto (JP)

(72) Inventor: Goshi Akiyama, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 164 days.

(21) Appl. No.: 18/688,318

(22) PCT Filed: Mar. 10, 2022

(86) PCT No.: PCT/JP2022/010561
§ 371 (c)(1),
(2) Date: Feb. 29, 2024

(87) PCT Pub. No.: WO2023/032286
PCT Pub. Date: Mar. 9, 2023

(65) Prior Publication Data
US 2024/0385130 A1    Nov. 21, 2024

(30) Foreign Application Priority Data
Aug. 31, 2021 (JP) ................................ 2021-141055

(51) Int. Cl.
*G01N 23/223* (2006.01)

(52) U.S. Cl.
CPC ..... *G01N 23/223* (2013.01); *G01N 2223/204* (2013.01)

(58) Field of Classification Search
CPC .... H01J 27/02; H01J 27/024; H01J 2237/045; H01J 37/04; H01J 37/09; G01N 15/1434;
(Continued)

(56) References Cited

U.S. PATENT DOCUMENTS

| | | |
|---|---|---|
| 6,477,237 B1 | 11/2002 | Taniguchi et al. |
| 2002/0172322 A1 | 11/2002 | Kawahara et al. |
| 2011/0255662 A1 | 10/2011 | Shannon, Jr. |

FOREIGN PATENT DOCUMENTS

| | | |
|---|---|---|
| JP | H02-088607 U | 7/1990 |
| JP | 2503862 B2 | 11/1994 |

(Continued)

OTHER PUBLICATIONS

Notice of Reasons for Refusal dated Nov. 5, 2024 for Japanese Patent Application No. 2023-545039.
(Continued)

*Primary Examiner* — Don K Wong
(74) *Attorney, Agent, or Firm* — Muir Patent Law, PLLC (57) ABSTRACT

An aperture member narrows an irradiation range of primary X-rays generated by an X-ray tube. The analysis unit analyzes fluorescent X-rays generated from a sample when the sample is irradiated with the primary X-rays that have passed through the aperture member. The aperture member includes a first opening formed on an incident side of the primary X-rays, a second opening formed on an emission side of the primary X-rays, and a hole formed between the first opening and the second opening to allow the primary X-rays to pass through. The aperture member includes a shielding portion formed on an inner surface of the hole, the shielding portion being formed between the X-ray tube and the peripheral portion of the second opening and on a side outer than a straight line connecting the X-ray tube and the edge portion of the second opening.

6 Claims, 6 Drawing Sheets

(58) Field of Classification Search
CPC .. G01N 15/1436; G01N 21/00; G01N 23/223; G01N 2223/204; G01N 2223/076; G01N 21/6428; G01N 21/64; G01N 21/6458; G01N 15/075; G21K 5/00; G21K 5/02; A61B 6/06; A61B 6/483

See application file for complete search history.

(56) References Cited

FOREIGN PATENT DOCUMENTS

| | | |
|---|---|---|
| JP | H07-140573 A | 6/1995 |
| JP | H08-247968 A | 9/1996 |
| JP | 3639855 B2 | 10/1998 |
| JP | 2001-085192 A | 3/2001 |
| JP | 2001-208705 A | 8/2001 |
| JP | 2002-340824 A | 11/2002 |
| JP | 2009002795 A * | 1/2009 |

OTHER PUBLICATIONS

PCT Written Opinion of the International Searching Authority dated May 24, 2022, for PCT application No. PCT/JP2022/010561.

Bruker Nano Analytics, S1 TITAN, Handheld XRF Analyzer for Elemental Analysis, May 29, 2020.

Notice of Reasons for Refusal dated Mar. 25, 2025, for corresponding Japanese Patent Application No. 2023-545039.

* cited by examiner

X-RAY FLUORESCENCE ANALYZER AND X-RAY APERTURE MEMBER

TECHNICAL FIELD

The present invention relates to an X-ray fluorescence analyzer and an X-ray aperture member.

BACKGROUND ART

Japanese Unexamined Patent Application Publication No. 2009-2795 (Patent Document 1) discloses that in an X-ray fluorescence analyzer, primary X-rays emitted from an X-ray tube are emitted to a sample, and fluorescent X-rays generated from the sample are detected by a detector to perform qualitative and quantitative analysis of elements contained in the sample.

PRIOR ART DOCUMENT

Patent Document

Patent Document 1: Japanese Unexamined Patent Application Publication No. 2009-2795

SUMMARY OF THE INVENTION

Problems to Be Solved by the Invention

In a conventional X-ray fluorescence analyzer, it is known to be configured such that primary X-rays emitted from an X-ray tube are made to pass through an aperture member with a circular hole to narrow the emission range of the primary X-rays. The primary X-rays, having passed through the aperture member, are irradiated onto the sample after subsequently passing through, for example, a primary X-ray filter and a collimator lens.

However, the peripheral portion of the hole of the aperture member on the primary X-ray's emission side is thinner in the primary X-ray's incident direction than other portions. Therefore, there was a possibility that fluorescent X-rays from the aperture member, generated by the incident primary X-rays at the peripheral portion, would be mixed with the primary X-rays that have passed through the hole. These X-rays were then emitted onto the sample stage and detected by the detector. In this way, when fluorescent X-rays from the aperture member are mixed with the primary X-rays, there is a risk that these fluorescent X-rays will be detected as noise.

The present disclosure has been made to solve such problems. The purpose of the present disclosure is to suppress emission of fluorescent X-rays from an aperture member to reduce noise in an X-ray fluorescence analyzer.

Means for Solving the Problems

A first aspect of the present invention relates to an X-ray fluorescence analyzer. The X-ray fluorescence analyzer is equipped with an X-ray tube, an aperture member, and an analysis unit. The aperture member narrows the irradiation range of the primary X-rays generated by the X-ray tube. The analysis unit analyzes the fluorescent X-rays generated from the sample when the sample is irradiated with the primary X-rays that have passed through the aperture member. The aperture member has a first opening formed on the incident side of the primary X-rays, a second opening portion formed on the outgoing side of the primary X-rays, and a hole formed between the first opening and the second opening to allow the primary X-rays to pass through. When a direction from a center of the second opening toward an end portion that is a corner of a peripheral portion of the second opening is referred to as a first direction, the aperture member includes a shielding portion formed on an inner surface of the hole, the shielding portion being formed between the X-ray tube and the peripheral portion of the second opening and on a side in the first direction than a straight line connecting the X-ray tube and the edge portion of the second opening.

A second aspect of the present invention relates to an aperture member. The aperture member has a first opening formed on an incident side of X-rays, a second opening formed on an emission side of the X-rays, and a hole formed between the first opening and the second opening to allow the X-rays to pass through. When a direction from a center of the second opening toward an end portion that a corner of a peripheral portion of the second opening is referred to as a first direction, the aperture member includes a shielding portion formed on an inner surface of the hole, the shielding portion being formed between the X-ray source and the peripheral portion of the second opening and on a side in the first direction than a straight line connecting the X-ray source and the end portion of the second opening.

According to the present disclosure, the primary X-rays generated from the X-ray tube are shielded by the shielding portion formed on the inner surface of the hole in the aperture member, and the incidence of primary X-rays on the peripheral portion of the second opening in the aperture member is reduced. Therefore, the generation of fluorescent X-rays due to the incidence of primary X-rays on the peripheral portion is suppressed, and the possibility of exposure to the sample stage is reduced, which in turn can reduce noise.

EMBODIMENTS FOR CARRYING OUT THE INVENTION

Hereinafter, some embodiments of the present invention will be described in detail with reference to the attached drawings. Note that the same or equivalent portion in the figures is assigned by the same reference symbol, and the description will not be repeated.

[1. Configuration of X-Ray Fluorescence Analyzer]

Figure 1:
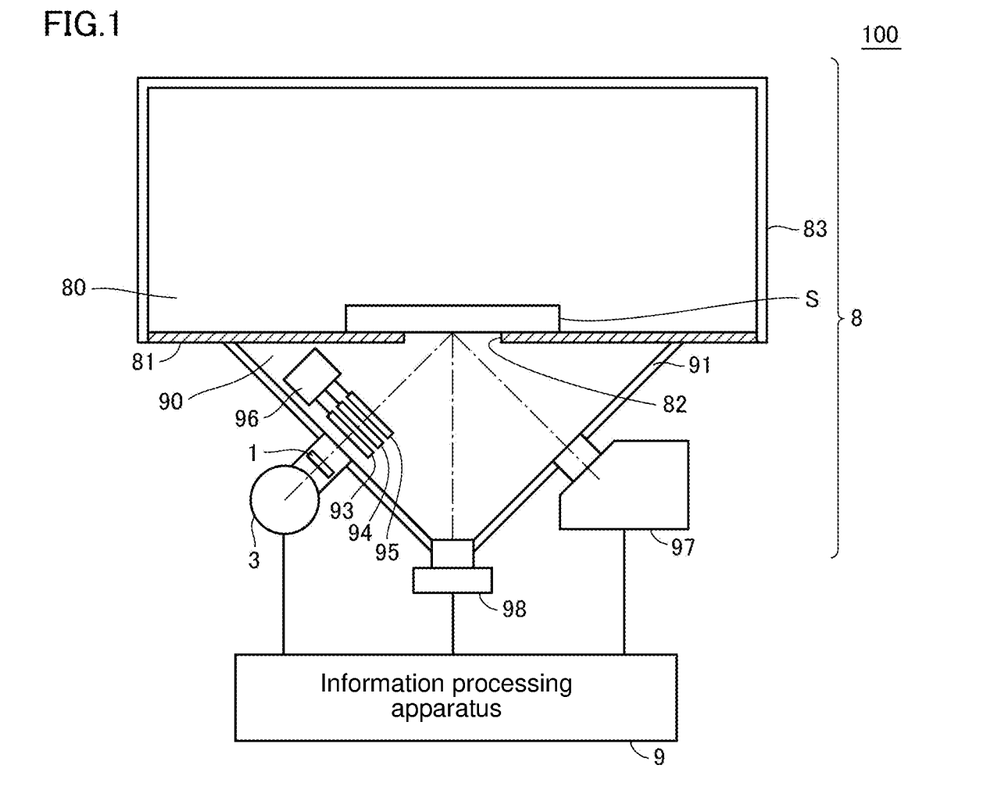
FIG. 1 is a schematic diagram showing the configuration of an analyzer according to an embodiment of the present invention.

FIG. 1 is a schematic diagram showing the configuration of an analyzer according to an embodiment of the present invention. Referring to FIG. 1, the analyzer 100 is an X-ray fluorescence analyzer. The analyzer 100 includes a main body 8 and a processing apparatus 9.

The main body 8 includes a housing 83, a housing 91, and a sample stage 81. The housing 83 is installed on the top surface of the sample stage 81. The housing 83 and the sample stage 81 form the sample chamber 80. The housing 91 is installed on the bottom surface of the sample stage 81. The housing 91 and the sample stage 81 form the measurement chamber 90. The sample chamber 80 and the measurement chamber 90 are hermetically enclosed by the housing 83 and the housing 91.

The sample stage 81 has an opening 82, and the sample S is placed on the sample stage 81 to cover the opening 82. At the time of the measurement, the sample S is placed on the sample stage 81 so that the measurement position of the sample S is exposed to the measurement chamber 90 at the opening 82.

In the measurement chamber 90, the aperture member 1, an X-ray tube 3, the housing 91, a shutter 93, a filter 94, a collimator 95, a drive mechanism 96, a detector 97, and an imaging unit 98 are arranged.

The X-ray tube 3 and the detector 97 are installed on the wall of the measurement chamber 90. The X-ray tube 3 includes a filament that emits thermal electrons and a target that converts the thermal electrons into given primary X-rays and emits them. The primary X-rays emitted from the X-ray tube 3 are emitted onto the measurement position of the sample S through the opening 82. Secondary X-rays (fluorescent X-rays) generated from the sample S are incident on the detector 97, and the detector 97 measures the energy and the intensity of the fluorescent X-rays. In the optical path of the primary X-rays from the X-ray tube 3 to the sample S, the aperture member 1, the shutter 93, the filter 94, and the collimator 95 are arranged in that order. The shutter 93, the filter 94, and the collimator 95 are configured to be slidable by a drive mechanism 96.

The aperture member 1 narrows the emission range of the primary X-rays emitted from the X-ray tube 3. The primary X-rays, whose emission range has been narrowed by the aperture member 1, enter the filter 94.

The filter 94 is a primary X-ray filter made of a purpose-selected metal foil and configured to attenuate the background components of the primary X-rays emitted from the X-ray tube 3 to improve the S/N ratio of the required characteristic X-rays. In one example, the filter 94 is composed of a plurality of filters made of mutually different metals, and the filter selected in accordance with the purpose is inserted into the optical path of the primary X-rays by the drive mechanism 96. The primary X-rays that have passed through the filter 94 enter the collimator 95.

The collimator 95 has a circular opening in the center, which determines the size of the beam of the primary X-rays emitted to the sample S. The collimator 95 is made of an X-ray absorbing material, such as, e.g., lead and brass. In one example, the collimator 95 is composed, for example, of a plurality of collimators with mutually different opening diameters, and a collimator selected according to the purpose is inserted on the primary X-ray beam line by the drive mechanism 96. The primary X-rays beam that has passed through the collimator 95 is emitted to the sample S.

The shutter 93 is made of an X-ray absorbing material, such as, e.g., lead, and can be inserted into the primary X-ray path to shield the primary X-rays when necessary.

The imaging unit 98 is installed in the lower part of the measurement chamber 90. The imaging unit 98 images the sample S at the measurement position through the opening 82 formed in the sample stage 81. The imaging unit 98 is configured to include an imaging element that is partitioned into a plurality of pixels, such as, e.g., a CMOS (Complementary Metal Oxide Semiconductor) and a CCD (Charge Coupled Device). The measurer conducting the X-ray fluorescence analysis can adjust the measurement position of the sample S while viewing the image acquired by the imaging unit 98 on the display device (not illustrated in the figure) before the measurement.

The processing apparatus 9 is configured to include a CPU (Central Processing Unit), which is an operation processing unit. A personal computer, for example, can be used as the processing apparatus 9. The processing apparatus 9 is connected to the X-ray tube 3, the detector 97, and the imaging unit 98.

The processing apparatus 9 controls the measurement by the main body 8. Specifically, the processing apparatus 9 controls the tube voltage and the tube current in the X-ray tube 3, and the irradiation time, as well as drives each of the shutter 93, the filter 94, and the collimator 95.

The processing apparatus 9 acquires the spectrum of the fluorescent X-rays detected by the detector 97 during the measurement. The processing apparatus 9 performs the quantitative analysis of each element based on the spectrum of the fluorescent X-rays detected by the detector 97. In the spectrum of the fluorescent X-rays, the peak of the fluorescent X-rays appears at the energy position specific to each element. Therefore, by examining the peak positions of the spectrum of fluorescent X-rays, the elements contained in the sample S can be identified.

[2. Aperture Member According to this Embodiment]

Figure 2:
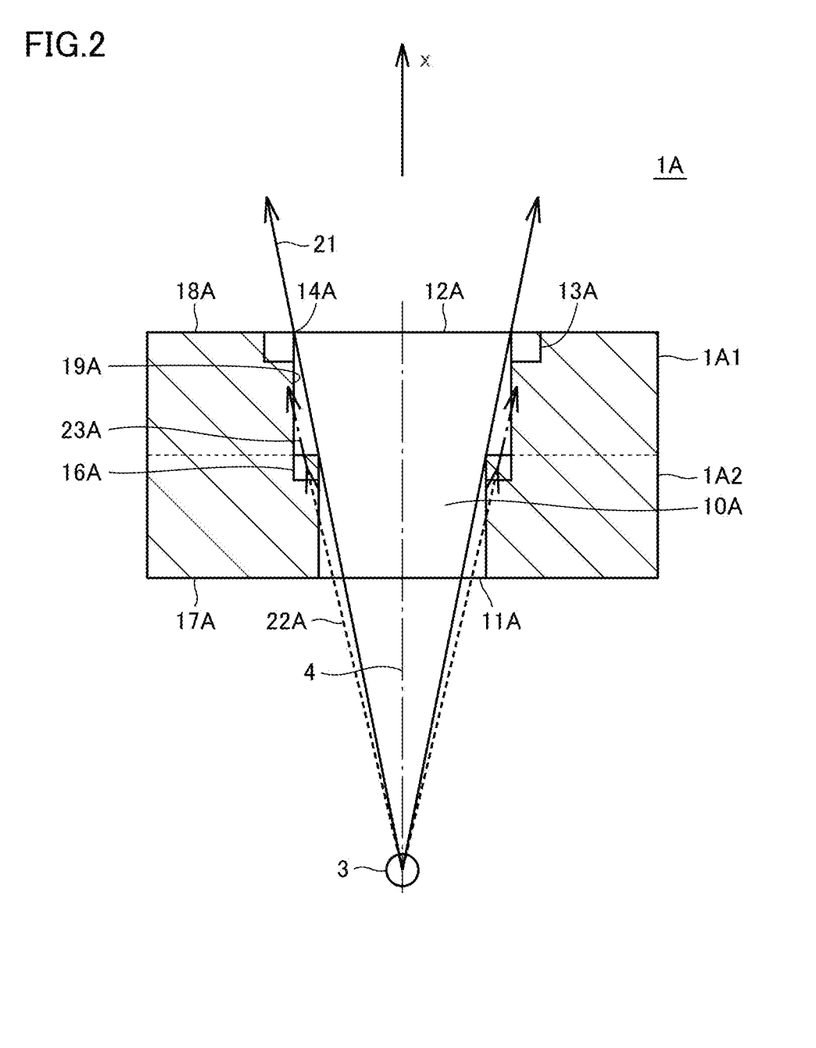
FIG. 2 is a cross-sectional view showing one example of an aperture member according to the embodiment of the present invention.

FIG. 2 is a cross-sectional view of the aperture member 1A, which is one example of the aperture member 1 according to an embodiment of the present invention. Referring to FIG. 2, the aperture member 1A has a first opening 11A formed on the incident side of the primary X-rays and a second opening 12A formed on the emission side of the primary X-rays. A hole 10A is formed between the first opening 11A and the second opening 12A to allow the primary X-rays to pass through.

In this specification, the central axis 4 of the primary X-rays in the emission range is referred to as an X-axis, and the positive direction of the X-axis is referred to as an emission direction. Further, the direction from the central axis 4 toward the inner surface 19A of the hole 10A is referred to as an "outward/outer side (or first direction)." Conversely, the direction from the inner surface 19A of the hole 10A toward the central axis 4 is referred to as an "inward/inner side (or second direction)."

The arrow 21 indicates the emission range of the primary X-rays narrowed by the second opening 12A of the aperture member 1A. The arrow 22A indicates the propagation direction of the primary X-rays emitted slightly on the outer side than the emission range.

More specifically, in the aperture member 1A, the first opening 11A and the second opening 12A each have a circular shape. The diameter of the second opening 12A is larger than that of the first opening 11A. The inner surface 19A of the hole 10A is formed in a two-stepped staircase manner. The corner portion of the stepped portion between the first opening 11A and the second opening 12A is formed between the X-ray tube 3 and the peripheral portion 13A of the second opening 12A and corresponds to the shielding portion 16A described below.

[3. Comparison with Aperture Member of Comparative Example]

Figure 3:
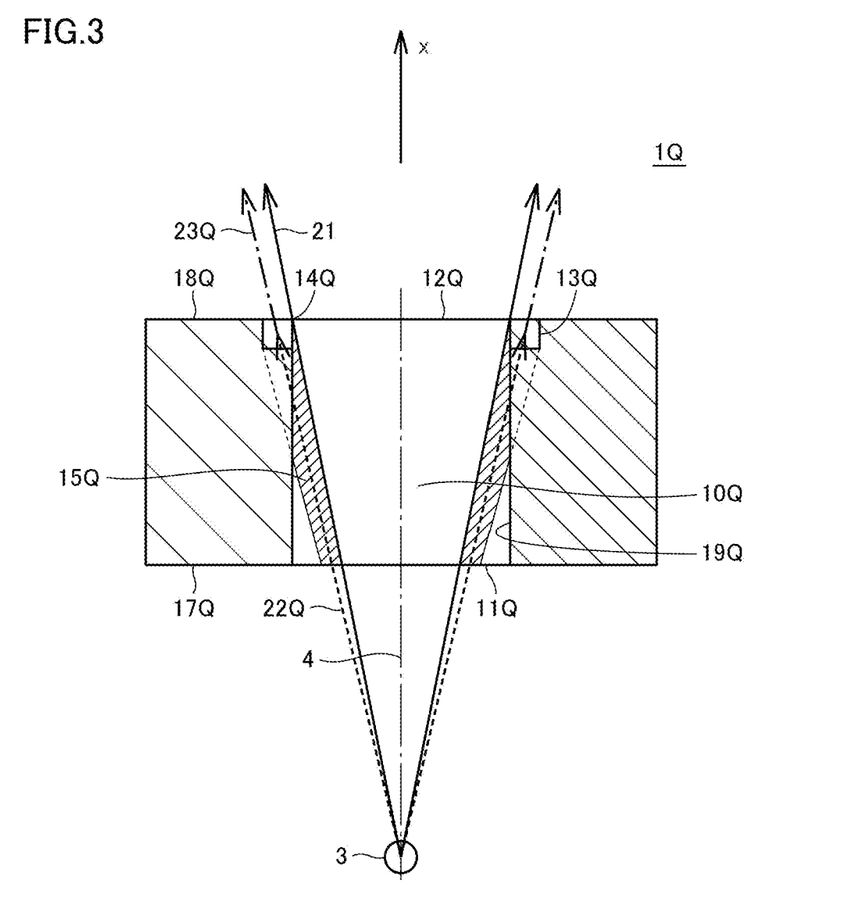
FIG. 3 is a cross-sectional view showing an aperture member according to Comparative Example.

FIG. 3 is a cross-sectional view showing an aperture member 1Q according to Comparative Example. Referring to FIG. 3, the aperture member 1Q has a cylindrical hole 10Q penetrating through the center of the cylindrical member. The opening of the aperture member 1Q on the incident side of the primary X-rays is referred to as a first opening 11Q, and the opening on the emission side is referred to as a second opening 12Q.

The emission range of the primary X-rays narrowed by the aperture member 1Q is indicated by the arrows 21. As shown by the arrows 21, the emission range of the primary X-rays emitted from the X-ray tube 3 is narrowed by the aperture member 1Q to a range on the inner side of the straight line connecting the X-ray tube 3 and the edge portion 14Q of the second opening 12Q. The edge portion 14Q is the corner of the peripheral portion 13Q of the second opening 12Q. More specifically, the edge portion 14Q indicates the vertex of the corner of the peripheral portion 13Q.

With the aperture member 1Q, of the primary X-rays emitted from the X-ray tube 3, the X-rays more on the inner side than the arrows 21 pass through the aperture member 1Q. On the other hand, of the primary X-rays emitted from the X-ray tube 3, the X-rays more on the outer side than the arrows 21 are shielded by the aperture member 1Q.

The arrow 22Q indicates the propagation direction of the primary X-rays emitted slightly more on an outer side than the arrow 21. The primary X-rays propagating in the direction of the arrow 22Q are incident on the peripheral portions 13Q of the second opening 12Q. The peripheral portion 13Q is a portion included in a range from the edge portion 14Q by a predetermined distance. Here, in the peripheral portion 13Q, the thickness in the direction of the arrow 22Q is relatively thinner than the thickness of the other portions of the aperture member 1Q in the propagation direction of the primary X-rays. Therefore, at the peripheral portion 13Q, there is a risk that fluorescent X-rays generated by the incident primary X-rays may emit from the peripheral portion 13Q, reach the sample stage, and be detected by the detector 97. Therefore, there is a possibility that the fluorescent X-rays generated at the peripheral portion 13Q of the aperture member 1Q are mixed with the primary X-rays emitted from the second opening 12Q, and the fluorescent X-ray components of the aperture member 1Q may be detected as noise in the analysis results.

Therefore, in the analyzer 100 of this embodiment, a shielding portion is formed between the X-ray tube 3 and the peripheral portion (the shaded portion 15Q in FIG. 3) on the inner inside of the hole in the aperture member 1. With this, in the aperture member 1A, the primary X-rays generated by the X-ray tube 3 and propagating in the direction of the arrow 22A are shielded by the shielding portion 16A and do not enter the peripheral portion 13A. Therefore, it is possible to reduce the noise generated from the sample stage 81 by being irradiated with the fluorescent X-rays generated from the peripheral portion 13A.

Note that the fluorescent X-rays generated by the primary X-rays incident on the shielding portion 16A are shielded at the inner surface 19A, as indicated by the arrow 23A, and are less likely to be detected as noise in the detector 97.

Further, the shielding portion 16A is formed more on the outer side than the straight line connecting the X-ray tube 3 and the edge portion 14A of the second opening 12A. In other words, the shielding portion 16A is formed more on the outer side than the arrow 21. Therefore, the shielding portion 16A does not narrow the irradiation range of the primary X-rays as defined by the second opening 12A.

The aperture member 1A may, for example, be formed by a combination of a plurality of parts. The aperture member 1A may be formed, for example, by joining two members 1A1 and 1A2 one on top of the other. In this case, the diameter of the hole formed in the member 1A1 corresponds to the diameter of the first opening 11A. Further, the diameter of the hole formed in the member 1A2 corresponds to the diameter of the second opening 12A. In this case, it is sufficient to form two holes with different diameters in two members of the same shape and join them together, which reduces the production cost. Alternatively, the aperture member 1A may be formed integrally. In this case, a hole with a diameter corresponding to the first opening 11A is formed in the material of the aperture member 1A, and then a hole with a diameter corresponding to the second opening 12A is formed halfway through the thickness direction to form a step.

The aperture member 1A is made of brass or tungsten, for example. In the case of using brass, the cost of the aperture member 1A can be kept low. In the case of using tungsten, it is more expensive than in the case using brass. However, it is possible to further enhance the primary X-ray shielding effects in the portion of the aperture member 1A other than the hole 10A.

Note that in the aperture member 1A, between the face (bottom surface) 17A in the negative direction of the X-axis and the face (top surface) 18A in the positive direction of the X-axis, the portion other than the hole 10A between the first opening 11A and the second opening 12A is solid. Therefore, in the aperture member 1A, the primary X-ray shielding effect in the portions other than the hole 10A is greater, as compared with the case in which portions other than the hole 10A are hollow between the surface 17A and the surface 18A. Specifically, in the aperture member 1, the effect of preventing primary X-rays from leaking outward from between the surface 17A and the surface 18A increases. Further, in the aperture member 1A, the effect of suppressing the leakage of primary X-rays in the positive direction of the X-axis in the portions other than the hole 10A increases.

As described above, the aperture member according to this embodiment suppresses the incidence of primary X-rays to the peripheral portion of the second opening by means of a shielding portion formed on the inner surface of the hole. Therefore, fluorescent X-rays generated from the peripheral portion of the aperture member can be suppressed, and the possibility of irradiation to the sample stage can be reduced, thus reducing the noise in the analysis results.

By providing the shielding portion before the primary X-rays enter the peripheral portion, the thickness in the primary X-ray propagation direction can be increased, which can reduce the amount of primary X-rays that penetrate the peripheral portion.

[4. Modifications]

Note that the configuration of the aperture member 1 according to this embodiment is not limited to the example shown in FIG. 2. It is sufficient that the shielding portion is formed between the X-ray tube 3 and the peripheral portion of the second opening, and the shielding portion is formed more on the outer side with respect to the propagation direction of the primary X-rays than the straight line connecting the X-ray tube and the edge portion of the second opening.

(Modification 1)

Figure 4:
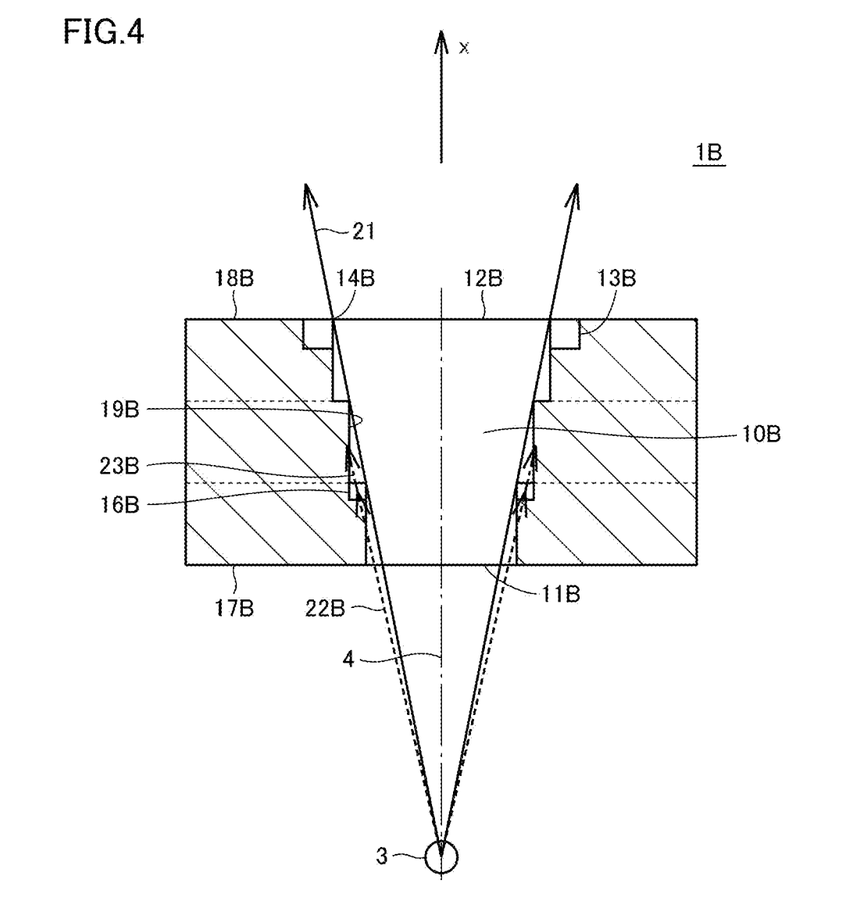
FIG. 4 is a cross-sectional view showing a modification of the aperture member according to an embodiment of the present invention.

For example, the inner surface of the aperture member 1 may be formed in the three or more-stepped staircase manner, as shown in FIG. 4. In this case, the shielding portion may be configured by at least one corner of the stepped portion formed between the first opening 11B and the second opening 12B. In the aperture member 1B shown in FIG. 4, for example, the first stepped corner portion from the first opening 11B constitutes the shielding portion 16B. The aperture member 1B is formed, for example, by stacking three discs with different holes and joining them together.

By configuring the aperture member 1 in a plurality of stages as in the aperture member 1B, it is easier to form a solid between the arrow 21 and the inner surface FIG. 19A, as compared with the case of FIG. 2. In other words, between the arrow 21 and the inner surface 19A, a space portion reduces, and the occupation ratio of the interior of the aperture member 1 increases. Therefore, the shielding effect of primary X-rays emitted more on the outer side than the arrows 21, as typified by the arrows 22B, increases.

(Modification 2)

Figure 5:
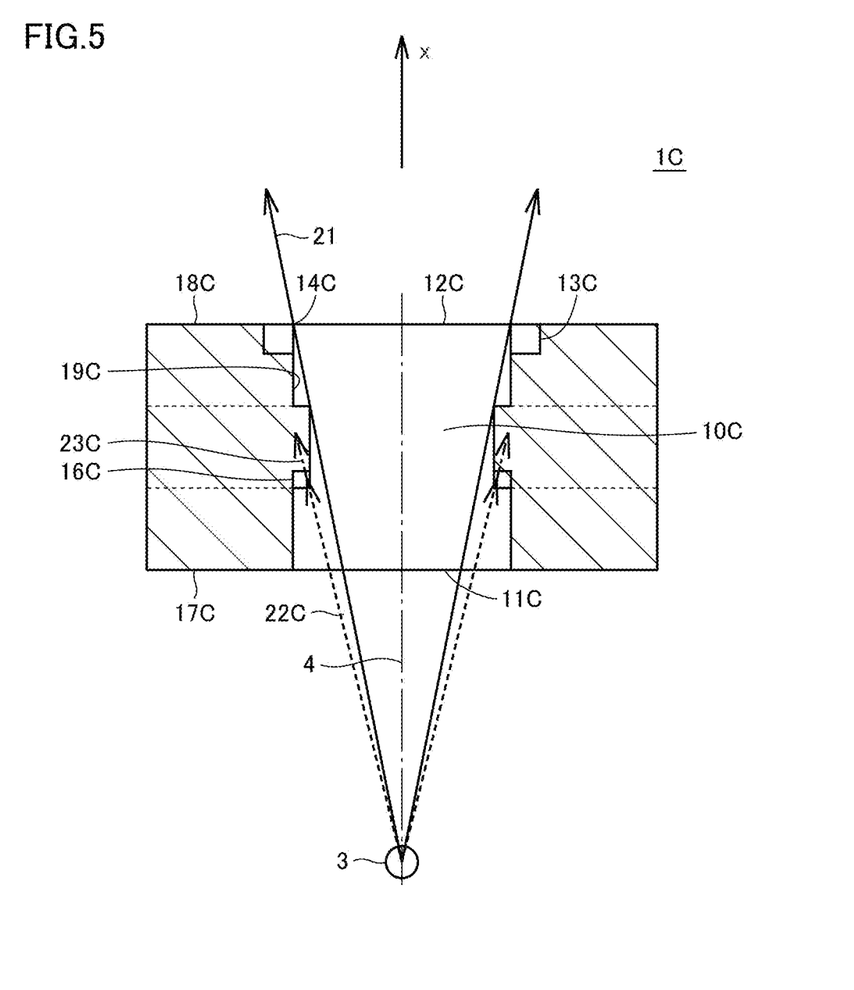
FIG. 5 is a cross-sectional view showing a modification of the aperture member according to an embodiment of the present invention.

Further, the diameter of the second opening of the aperture member 1 does not necessarily have to be larger than the diameter of the first opening. That is, as shown in FIG. 5, the diameter of the second opening may be equal to or smaller than that of the first opening. Referring to FIG. 5, in the aperture member 1C, the diameter of the second opening 12C is equal to the diameter of the first opening 11C. Thus, for example, when installing the aperture member 1C on the analyzer 100, the same effects are achieved regardless of whether the first opening of the aperture member 1C is positioned either in the positive direction or in the negative direction of the X-axis.

(Modification 3)

Figure 6:
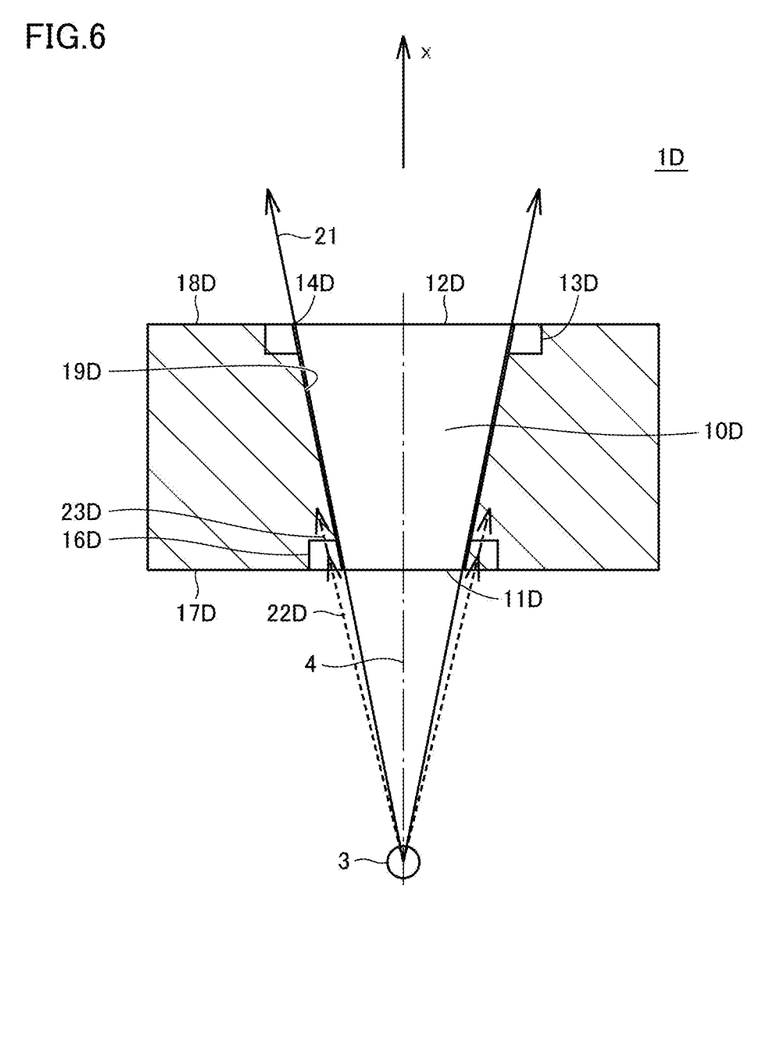
FIG. 6 is a cross-sectional view showing a modification of the aperture member according to an embodiment of the present invention.

Furthermore, the inner surface of the aperture member 1 may be tapered, as shown in FIG. 6. Referring to FIG. 6, the first opening 11D and the second opening 12D of the aperture member 1D each have a circular shape. The inner surface 19D of the hole 10D formed between the first opening 11D and the second opening 12D is tapered. The diameter of the hole 10D increases in a tapered manner from the first opening 11D to the second opening 12D. In the aperture member 1D, the portion along the inner surface 19D is the shielding portion 16D. The arrow 22D indicates the primary X-rays emitted slightly more on the outer side than the arrow 21, in the same manner as the arrow 22Q. The shielding portion 16D shields the primary X-rays indicated by the arrow 22D. On the other hand, the portion between the arrow 21 and the inner surface 19D becomes more solid as compared with the case shown in FIG. 2. In other words, between the arrow 21 and the inner surface 19D, a space portion reduces, and the occupation ratio of the interior of the aperture member 1 increases. Therefore, the shielding effect of primary X-rays emitted more on the outer side than the arrow 21, as typified by the arrow 22D, increases.

Further, the configuration of the aperture member 1 according to this embodiment is not limited to the aperture for the primary X-rays emitted from the X-ray tube 3 in the X-ray fluorescence analyzer described above, but may be applied to other X-ray aperture structures. For example, the configuration of the aperture member 1 according to this embodiment may be applied to a collimator. Further, the configuration of the aperture member 1 according to this embodiment may also be applied to the aperture member in the case where the X-ray fluorescence analyzer is equipped with an aperture member for fluorescent X-rays generated at the sample stage. In this case, the sample placed on the sample stage corresponds to an example of the "X-ray source." Further, it may be used as an aperture member for X-rays in other X-ray apparatus that use X-rays. In this case, the object emitting X-rays to the aperture member corresponds to an example of the "X-ray source."

Note that the shape of the hole when viewed the aperture member 1 from the X-ray emission direction (X-axis direction) is not limited to a circular shape but may be other shapes, such as, e.g., polygonal and elliptical, in accordance with the intended use or manufacturing convenience.

[Aspects]

It would be understood by those skilled in the art that the exemplary embodiments described above are specific examples of the following aspects.

(Item 1)

The X-ray fluorescence analyzer is equipped with an X-ray tube, an aperture member, and an analysis unit. The aperture member narrows the irradiation range of primary X-rays generated by the X-ray tube. The analysis unit analyzes fluorescent X-rays generated from the sample when the sample is irradiated with the primary X-rays that have passed through the aperture member. The aperture member has a first opening formed on the incident side of the primary X-rays, a second opening portion formed on the emission side of the primary X-rays, and a hole formed between the first opening and the second opening to allow the primary X-rays to pass through. When the direction from the center of the second opening to the end portion which is the corner of the peripheral portion of the second opening is referred to as a first direction, the aperture member includes a shielding portion formed on the inner surface of the hole between the X-ray tube and the peripheral portion of the second opening and more on a side in the first direction than a straight line connecting the X-ray tube and the edge portion of the second opening.

According to the X-ray fluorescence analyzer as recited in the above-described Item 1, the primary X-rays generated from the X-ray tube are shielded by the shielding portion formed on the inner surface of the hole in the aperture member, and the incidence of primary X-rays on the peripheral portion of the second opening in the aperture member reduces. Therefore, the generation of fluorescent X-rays due to the incidence of primary X-rays on the peripheral portion is suppressed, and the possibility of exposure to the sample table reduces, which in turn can reduce noise.

(Item 2)

In the X-ray fluorescence analyzer as recited in the above-described Item 1, the first opening and the second opening each have a circular shape. The inner surface of the hole is formed in a two-stepped staircase manner. A diameter of the second opening is larger than a diameter of the first opening. The shielding portion is a corner portion of a stepped portion located between the first opening and the second opening.

The aperture member in the X-ray fluorescence analyzer as recited in the above-described Item 2 can be formed by forming two holes of different diameters in two members of the same shape and joining them together. Alternatively, it can be formed by forming a hole in the material of the aperture member with a diameter corresponding to the first opening and then forming a hole with a diameter corresponding to the second opening halfway through the thickness direction. In other words, the formation of the aperture member is easy, and the production cost can be reduced.

(Item 3)

In the X-ray fluorescence analyzer as recited in the above-described Item 1, the first opening and the second opening each have a circular shape. The inner surface of the hole is formed in a two or more-stepped staircase manner. A diameter of the hole increases stepwise from the first opening to the second opening. The shielding portion is configured by at least one corner portion of a stepped portion located between the first opening and the second opening.

In the aperture member in the X-ray fluorescence analyzer as recited in the above-described Item 3, the portion between the straight line connecting the X-ray tube and the edge portion and the inner surface of the hole can be easily formed as a solid, as compared with the case in which the inner surface of the hole is formed in a two-stepped staircase manner. In other words, the shielding effect of primary X-rays emitted more on the outer side than the straight line connecting the X-ray tube and the edge portions increases.
(Item 4)

In the X-ray fluorescence analyzer as recited in the above-described Item 1, the first opening and the second opening each have a circular shape. The inner surface of the hole is formed in a tapered shape. A diameter of the hole increases in a tapered manner from the first opening to the second opening.

In the aperture member in the X-ray fluorescence analyzer as recited in the above-described Item 4, the portion between the straight line connecting the X-ray tube and the edge portion and the inner surface of the hole is sold, as compared with the case in which the inner surface of the hole is formed as a two-step staircase. In other words, the shielding effect of primary X-rays emitted more on the outer side than the straight line connecting the X-ray tube and the edge portions increases.
(Item 5)

In the X-ray fluorescence analyzer as recited in any one of the above-described Items 1 to 4, the aperture member is solid between the incident side of the primary X-rays and the emission side of the primary X-rays.

According to the X-ray fluorescence analyzer as recited in the above-described Item 5, in the aperture member, the primary X-ray shielding effect is greater than in the case where the portion other than the hole between the incident side (lower surface) of primary X-rays and the emission side (upper surface) of primary X-rays is hollow. Specifically, in the aperture member as recited in the above-described Item 5, the effect of preventing primary X-rays from leaking outward from between the bottom surface and the top surface increases. Further, in the aperture member, the effect of suppressing the leakage of primary X-rays in the positive direction of the X-axis in portions other than the hole increases.
(Item 6)

An aperture member is an aperture member configured to narrow an irradiation range of X-rays. The aperture member includes a first opening formed on an incident side of the primary X-rays, a second opening formed on an emission side of the primary X-rays, and a hole formed between the first opening and the second opening. When a direction from a center of the second opening toward an end portion that is a corner of a peripheral portion of the second opening is referred to as a first direction, the aperture member includes a shielding portion formed on the inner surface of the hole, the shielding portion being formed between the X-ray tube and the peripheral portion of the second opening and more on a side in the first direction than a straight line connecting the X-ray tube and the edge portion of the second opening.

According to the X-ray fluorescence analyzer as recited in the above-described Item 6, the primary X-rays generated from the X-ray source are shielded by the shielding portion formed on the inner surface of the hole in the aperture member, and the incidence of primary X-rays on the peripheral portion of the second opening in the aperture member is reduced. Thus, the generation of fluorescent X-rays due to the incidence of primary X-rays on the peripheral portion is suppressed.

Note that the embodiments disclosed here should be considered illustrative and not restrictive in all respects. It should be noted that the scope of the invention is indicated by claims and is intended to include all modifications within the meaning and scope of the claims and equivalents.

DESCRIPTION OF REFERENCE SYMBOLS 1, 1A, 1B, 1C, 1D, 1Q: Aperture member
1A1, 1A2: Disc
3: X-ray tube
8: Main body
9: Processing apparatus
10A to 10D, 10Q: Hole
11A to 11D, 11Q: First opening
12A to 12D, 12Q: Second opening
13A-13D, 13Q: Peripheral portion
14A to 14D, 14Q: Edge portion
15Q: Shaded area
16A to 16D, 16Q: Shielding portion
17A to 17D, 17Q, 18A to 18D, 18Q: Face
19A to 19D, 19Q: Inner surface
80: Sample chamber
81: Sample stage
82: Opening
83, 91: Housing
90: Measurement chamber
92: Joint
93: Shutter
94: Filter
95: Collimator
96 Drive mechanism
97: Detector
98: Imaging unit
100: Analyzer
S: Sample

The invention claimed is:

1. An X-ray fluorescence analyzer comprising:
an X-ray tube;
an aperture member configured to narrow an irradiation range of primary X-rays generated by the X-ray tube; and
an analysis unit configured to analyze fluorescent X-rays generated from a sample when the sample is irradiated with the primary X-rays that have passed through the aperture member,
wherein the aperture member includes
a first opening formed on an incident side of the primary X-rays,
a second opening formed on an emission side of the primary X-rays, and
a hole formed between the first opening and the second opening,
wherein when a direction from a center of the second opening toward an edge portion that is a corner of a peripheral portion of the second opening is referred to as a first direction,
the aperture member includes a shielding portion formed on an inner surface of the hole, the shielding portion being formed between the X-ray tube and the peripheral portion of the second opening and on a side in the first direction from a straight line connecting the X-ray tube and the edge portion of the second opening.

2. The X-ray fluorescence analyzer as recited in claim 1,
wherein the first opening and the second opening each have a circular shape,
wherein the inner surface of the hole is formed in a two-stepped staircase manner,
wherein a diameter of the second opening is larger than a diameter of the first opening, and
wherein the shielding portion is a corner portion of a stepped portion located between the first opening and the second opening.

3. The X-ray fluorescence analyzer as recited in claim 1,
wherein the first opening and the second opening each have a circular shape,
wherein the inner surface of the hole is formed in a two or more-stepped staircase manner,
wherein a diameter of the hole increases stepwise from the first opening to the second opening, and
wherein the shielding portion is at least one corner portion of a stepped portion located between the first opening and the second opening.

4. The X-ray fluorescence analyzer as recited in claim 1,
wherein the first opening and the second opening each have a circular shape,
wherein the inner surface of the hole is formed in a tapered shape, and
wherein a diameter of the hole increases in a tapered manner from the first opening to the second opening.

5. The X-ray fluorescence analyzer as recited in claim 1,
wherein the aperture member is solid between the incident side of the primary X-rays and the emission side of the primary X-rays.

6. An aperture member configured to narrow an irradiation range of X-rays, comprising:
a first opening formed on an incident side of the primary X-rays;
a second opening formed on an emission side of the primary X-rays; and
a hole formed between the first opening and the second opening,
wherein when a direction from a center of the second opening toward an end portion that is a corner of a peripheral portion of the second opening is referred to as a first direction,
the aperture member includes a shielding portion formed on an inner surface of the hole, the shielding portion being formed between the X-ray tube and the peripheral portion of the second opening and on a side in the first direction from a straight line connecting the X-ray tube and the edge portion of the second opening.

* * * * *